United States Patent
Maeda et al.

(10) Patent No.: US 8,450,958 B2
(45) Date of Patent: May 28, 2013

(54) MOTOR CONTROL METHOD, MOTOR CONTROL DEVICE, FAN DEVICE, COMPRESSOR, AND PUMP DEVICE

(75) Inventors: Hirohito Maeda, Osaka (JP); Motonobu Ikeda, Osaka (JP); Satoshi Yagi, Osaka (JP); Keisuke Shimatani, Osaka (JP); Masafumi Hashimoto, Osaka (JP)

(73) Assignee: Daikin Industries, Ltd., Osaka-Shi (JP)

( * ) Notice: Subject to any disclaimer, the term of this patent is extended or adjusted under 35 U.S.C. 154(b) by 464 days.

(21) Appl. No.: 12/935,547

(22) PCT Filed: Mar. 12, 2009

(86) PCT No.: PCT/JP2009/054784
§ 371 (c)(1),
(2), (4) Date: Sep. 29, 2010

(87) PCT Pub. No.: WO2009/122880
PCT Pub. Date: Oct. 8, 2009

(65) Prior Publication Data
US 2011/0025242 A1 Feb. 3, 2011

(30) Foreign Application Priority Data
Mar. 31, 2008 (JP) .................................. 2008-090132

(51) Int. Cl.
*H02P 6/06* (2006.01)
*H02P 6/12* (2006.01)

(52) U.S. Cl.
USPC ................................ 318/400.09; 318/400.14

(58) Field of Classification Search
USPC .................. 318/700, 400.01, 400.04, 400.09, 318/400.14, 400.2
See application file for complete search history.

(56) References Cited

U.S. PATENT DOCUMENTS

| 4,228,396 | A | * | 10/1980 | Palombo et al. | 324/163 |
| 5,420,492 | A | * | 5/1995 | Sood et al. | 318/809 |
| 7,145,303 | B2 | * | 12/2006 | Lelkes | 318/400.09 |
| 7,173,393 | B2 | | 2/2007 | Maeda et al. | |
| 7,411,369 | B2 | | 8/2008 | Maeda et al. | |
| 7,671,557 | B2 | | 3/2010 | Maeda et al. | |
| 7,750,585 | B2 | * | 7/2010 | Schwarzkopf | 318/400.17 |
| 2006/0132076 | A1 | * | 6/2006 | Finsinger et al. | 318/439 |

FOREIGN PATENT DOCUMENTS

| CN | 1473391 A | 2/2004 |
| JP | 2001-86787 A | 3/2001 |
| JP | 2001-218493 A | 8/2001 |
| JP | 2001-268963 A | 9/2001 |
| JP | 2002-281780 A | 9/2002 |

* cited by examiner

*Primary Examiner* — Bentsu Ro
(74) *Attorney, Agent, or Firm* — Birch, Stewart, Kolasch & Birch, LLP

(57) ABSTRACT

Triggered by a position detection sensor detecting that a rotor is positioned at any one of K predetermined electrical angles, for example, 60°, 180°, and 300°, a voltage vector to be given to a motor is updated. When, for example, the rotation frequency is equal to or higher than a specified value, the predetermined electrical angles is changed into M, for example, into one angle of 60°.

13 Claims, 7 Drawing Sheets

MOTOR CONTROL METHOD, MOTOR CONTROL DEVICE, FAN DEVICE, COMPRESSOR, AND PUMP DEVICE

TECHNICAL FIELD

The present invention relates to a motor control method, a motor control device, a fan device, a compressor, and a pump device, and particularly relates to a method for controlling a motor by detecting the position of a rotor included in the motor.

BACKGROUND ART

Japanese Patent Application Laid-Open No. 2001-268963 discloses a method for controlling a motor. A motor control device includes a motor having a rotor, an inverter which gives a voltage vector to the motor, and a position detection sensor which detects the position of the rotor.

The position detection sensor detects that the rotor is positioned at electrical angles of 60°, 180°, and 300° for example, and, at a timing of the detection, updates the voltage vector to be given to the motor.

DISCLOSURE OF THE INVENTION

Problems to be Solved by the Invention

A position signal varies due to a variation in mounting of a position detection sensor, or the like. In the technique disclosed in Japanese Patent Application Laid-Open No. 2001-268963, particularly when a rotation frequency is high, for example, one of three-phase operation currents, which are given to a three-phase motor, becomes larger than the other operation currents due to the variation in the position signal, to cause instability of the rotation frequency.

Therefore, an object of the present invention is to provide a motor control method capable of stabilizing a rotation frequency.

Means for Solving the Problems

A first aspect of a motor control method according to the present invention repeatedly performs the steps of: (a) detecting, by a position detection sensor (Hu, Hv, Hw), that a rotor (3b) included in a motor (3) is positioned at K (K>1) predetermined electrical angles (S1); and (b) updating a voltage vector to be given to the motor, the updating being triggered by the detection (S11 to S16), the motor control method further performing the step of (c) increasing a ratio of an interval at which the steps (a) and (b) are repeatedly performed relative to one cycle of rotation of the rotor, by changing the number of the predetermined electrical angles into M (K>M≧1) (S12, ST3, ST4).

A second aspect of the motor control method according to the present invention is the motor control method according to the first aspect, and the step (b) includes performing the steps of: (b1) making an estimate value of the electrical angle coincident with the predetermined electrical angles, when it is detected in the step (a) that the rotor is positioned at the predetermined electrical angles; (b2) updating the estimate value based on a time elapsed since the step (b1) has been performed and a rotation frequency of the rotor (3b); and (b3) computing the voltage vector based on the estimate value of the electrical angle.

A third aspect of the motor control method according to the present invention is the motor control method according to the first or second aspect, and the step (c) is performed (ST3, ST4) when a rotation frequency of the rotor (3b) is higher than a specified value.

A fourth aspect of the motor control method according to the present invention is the motor control method according to the first or second aspect, and the step (c) is performed when a rate of change of the rotation frequency is higher than a specified value.

A first aspect of a motor control device according to the present invention includes: a motor (3) having a rotor; a position detection sensor (Hu, Hv, Hw) that detects that the rotor is positioned at a predetermined electrical angle; and a control section (4) that repeatedly performs the steps of (a) detecting, by the position detection sensor, that the rotor (3b) is positioned at K (K>1) predetermined electrical angles (S1) and (b) updating a voltage vector to be given to the motor, the updating being triggered by the detection (S11 to S16), and further performs the step of (c) increasing a ratio of an interval at which the steps (a) and (b) are repeatedly performed relative to one cycle of rotation of the rotor, by changing the number of the predetermined electrical angles into M (K>M≧1) (S12, ST3, ST4).

A second aspect of the motor control device according to the present invention is the motor control device according to the first aspect, and in the step (b), the control section (4) performs the steps of: (b1) making an estimate value of the electrical angle coincident with the predetermined electrical angles, when it is detected in the step (a) that the rotor is positioned at the predetermined electrical angles; (b2) updating the estimate value based on a time elapsed since the step (b1) has been performed and a rotation frequency of the rotor (3b); and (b3) computing the voltage vector based on the estimate value of the electrical angle.

A third aspect of the motor control device according to the present invention is the motor control device according to the first or second aspect, and the control section (4) performs the step (c) (ST3, ST4), when a rotation frequency of the rotor (3b) is higher than a specified value.

A fourth aspect of the motor control device according to the present invention is the motor control device according to the first or second aspect, and the control section (4) performs the step (c), when a rate of change of a rotation frequency of the rotor (3b) is higher than a specified value.

A first aspect of a fan device according to the present invention includes the motor control device according to any one of the first to fourth aspects, and a fan driven by said motor.

A first aspect of a compressor according to the present invention includes the motor control device according to any one of the first to fourth aspects, and a compressor mechanism driven by said motor.

A first aspect of a pump device according to the present invention includes the motor control device according to any one of the first to fourth aspects, and a pump having a flow rate therein controlled by the motor.

Effects of the Invention

In the first aspect of the motor control method according to the present invention and the first aspect of the motor control device according to the present invention, even if a detection error occurs in the step (a) due to a variation in mounting of the position detection sensor or the like, the frequency of performing the step (b) of updating the voltage vector per one cycle is reduced, so that the influence of the detection error can be reduced, thus enabling an appropriate voltage vector to be given to the motor.

The second aspect of the motor control method according to the present invention and the second aspect of the motor control device according to the present invention contribute to the realization of the motor control method according to the first aspect and the motor control device according to the first aspect, respectively.

In the third aspect of the motor control method according to the present invention and the third aspect of the motor control device according to the present invention, even if the rotation frequency of the rotor increases, an excessive reduction in the interval of updating the voltage vector is avoided, thus reducing the influence of the detection error of the position detection sensor.

In the fourth aspect of the motor control method according to the present invention and the fourth aspect of the motor control device according to the present invention, even if the rate of change of the rotation frequency of the rotor increases, the ratio of making coincidence with the predetermined electrical angle detected by the position detection sensor can be increased, and therefore the influence of the error in the estimate value of the electrical angle can be reduced.

The first aspect of the fan device according to the present invention, the first aspect of the compressor according to the present invention, and the first aspect of the pump device according to the present invention include the motor to which an appropriate voltage vector is applied. This can improve the efficiency, and thus can reduce the power consumption.

These and other objects, features, aspects and advantages of the present invention will become more apparent from the following detailed description of the present invention when taken in conjunction with the accompanying drawings.

BEST MODE FOR CARRYING OUT THE INVENTION

First Embodiment

Figure 1:
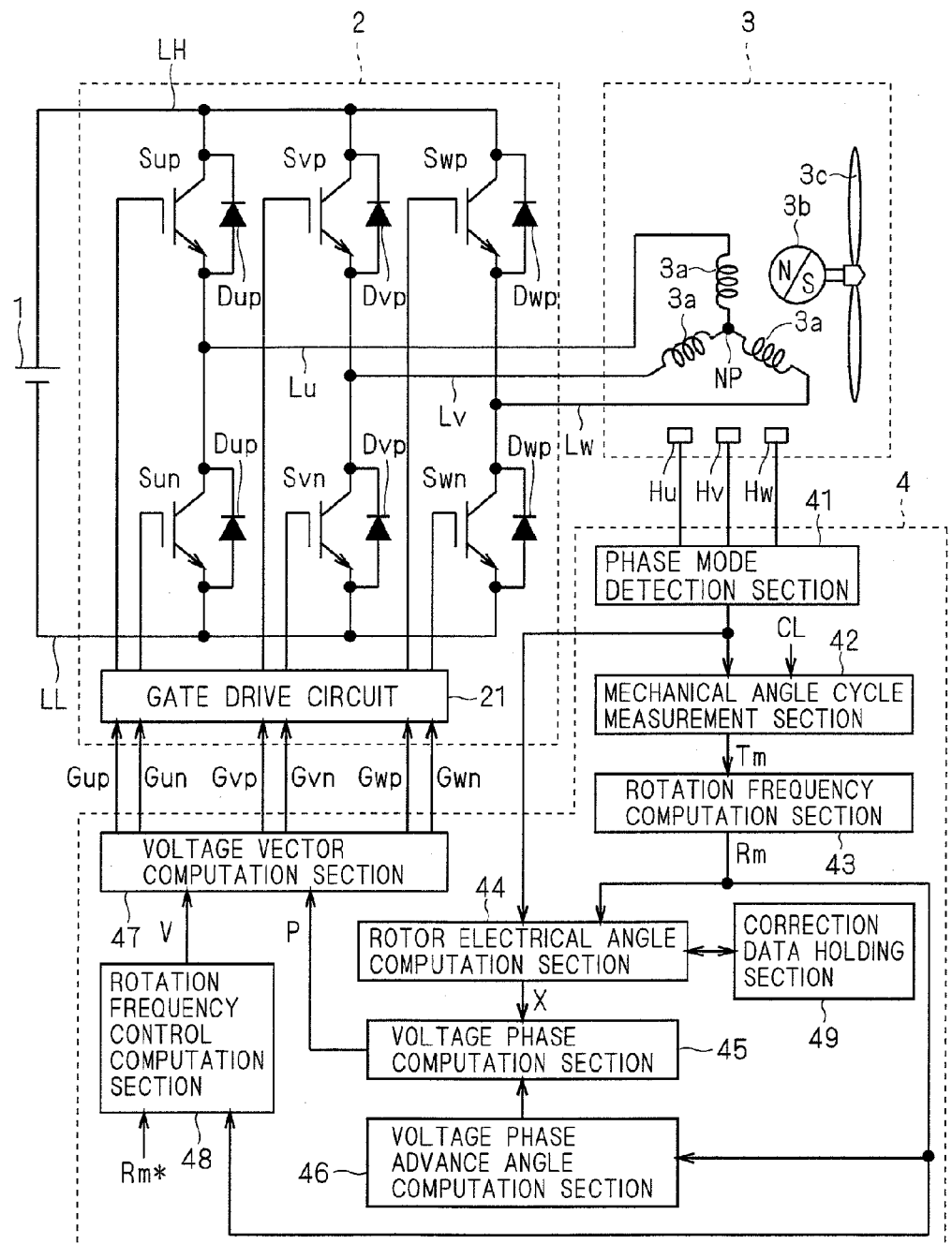
FIG. 1 is a diagram showing an exemplary conceptual configuration of a motor control device.

FIG. 1 shows an exemplary conceptual configuration of a motor control device. The motor control device includes a DC power source 1, an inverter 2, a gate drive circuit 21, a motor 3, position detection sensors Hu, Hv, Hw, and a control section 4. The control section 4 includes a phase mode detection section 41, a mechanical angle cycle measurement section 42, a rotation frequency computation section 43, a rotor electrical angle computation section 44, a voltage phase computation section 45, a voltage advance phase angle computation section 46, a voltage vector computation section 47, a rotation frequency control computation section 48, and a correction data holding section 49.

The DC power source 1 applies a DC voltage Vdc between DC power supply lines LH, LL.

The inverter 2 has high arm side switching elements Sxp (here, x represents u, v, w; hereinafter the same shall apply), low aim side switching elements Sxn, and free-wheeling diodes Dxp, Dxn. The high arm side switching element Sxp is an IGBT for example, and connected between an output line Lx and the DC power supply line LH. The low arm side switching element Sxn is an IGBT for example, and connected between the output line Lx and the DC power supply line LL. The free-wheeling diode Dxp is connected in parallel with the high arm side switching element Sxp, while an anode of the free-wheeling diode Dxp is at the output line Lx side and a cathode thereof is at the DC power supply line LH side. The free-wheeling diode Dxn is connected in parallel with the low arm side switching element Sxn, while an anode of the free-wheeling diode Dxn is at the DC power supply line LL side and a cathode thereof is at the output line Lx side.

The gate drive circuit 21 receives from the voltage vector computation section 47 gate signals Gxp, Gxn for rendering the respective switching elements Sxp, Sxn conducting, and outputs them to the respective switching elements Sxp, Sxn.

The motor 3 is, for example, a fan motor driven in three phases, and has three armature windings 3a, a rotor 3b, and a fan 3c. Each of the armature windings 3a has one end thereof connected to the output line Lx and the other end thereof connected to a neutral point NP. The rotor 3b is disposed opposed to the armature windings 3a. The rotor 3b is rotated in accordance with a magnetic field generated by operation currents flowing in the armature windings 3a. The fan 3c is rotated by rotation force of the rotor 3b.

The position detection sensors Hu, Hv, Hw are Hall sensors for example, and detect the position of the rotor 3b and output a position signal.

The motor control device is mounted in an air conditioner, for example. An air conditioner includes an outdoor unit and an indoor unit, in at least one of which the motor control device is mounted. Each of the indoor unit and the outdoor unit has a heat exchanger. The fan 3c blows into the heat exchanger, to facilitate heat exchange in the heat exchanger. The motor control device may also be mounted in a bathroom drier or a ventilator, for example. Since this motor control device drives the fan 3c, the present configuration can also be recognized as a fan device having the fan 3c and the motor control device excluding the fan 3c.

Hereinafter, descriptions will be given firstly of an outline of an operation method in this motor control device, and then of functions and operations of the phase mode detection section 41, the mechanical angle cycle measurement section 42, the rotation frequency computation section 43, the rotor electrical angle computation section 44, the voltage phase computation section 45, the voltage phase advance angle computation section 46, the voltage vector computation section 47, the rotation frequency control computation section 48, and the correction data holding section 49.

Figure 2:
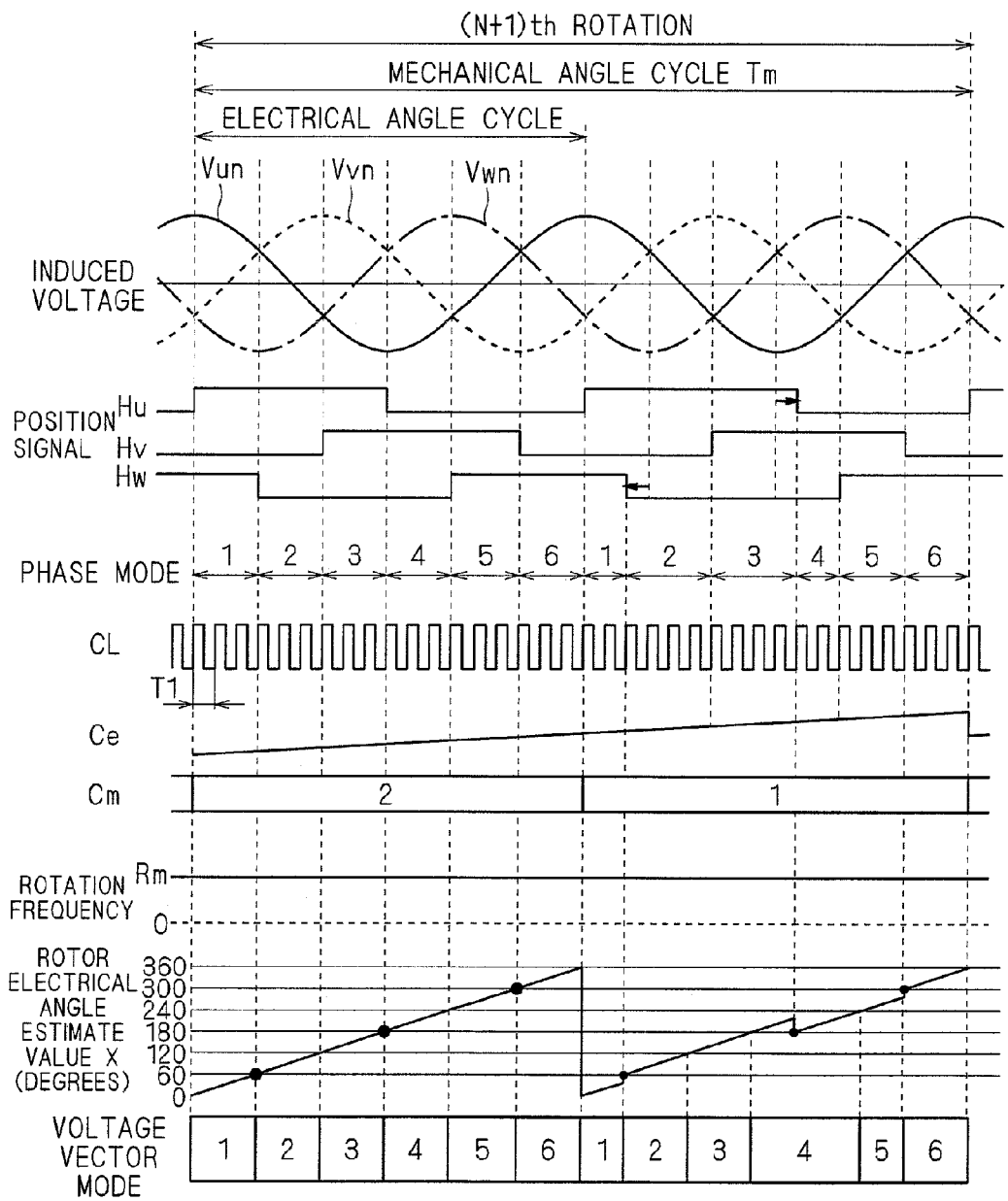
FIGS. 2 and 3 are diagrams showing a timing chart of the motor control device.
Figure 3:
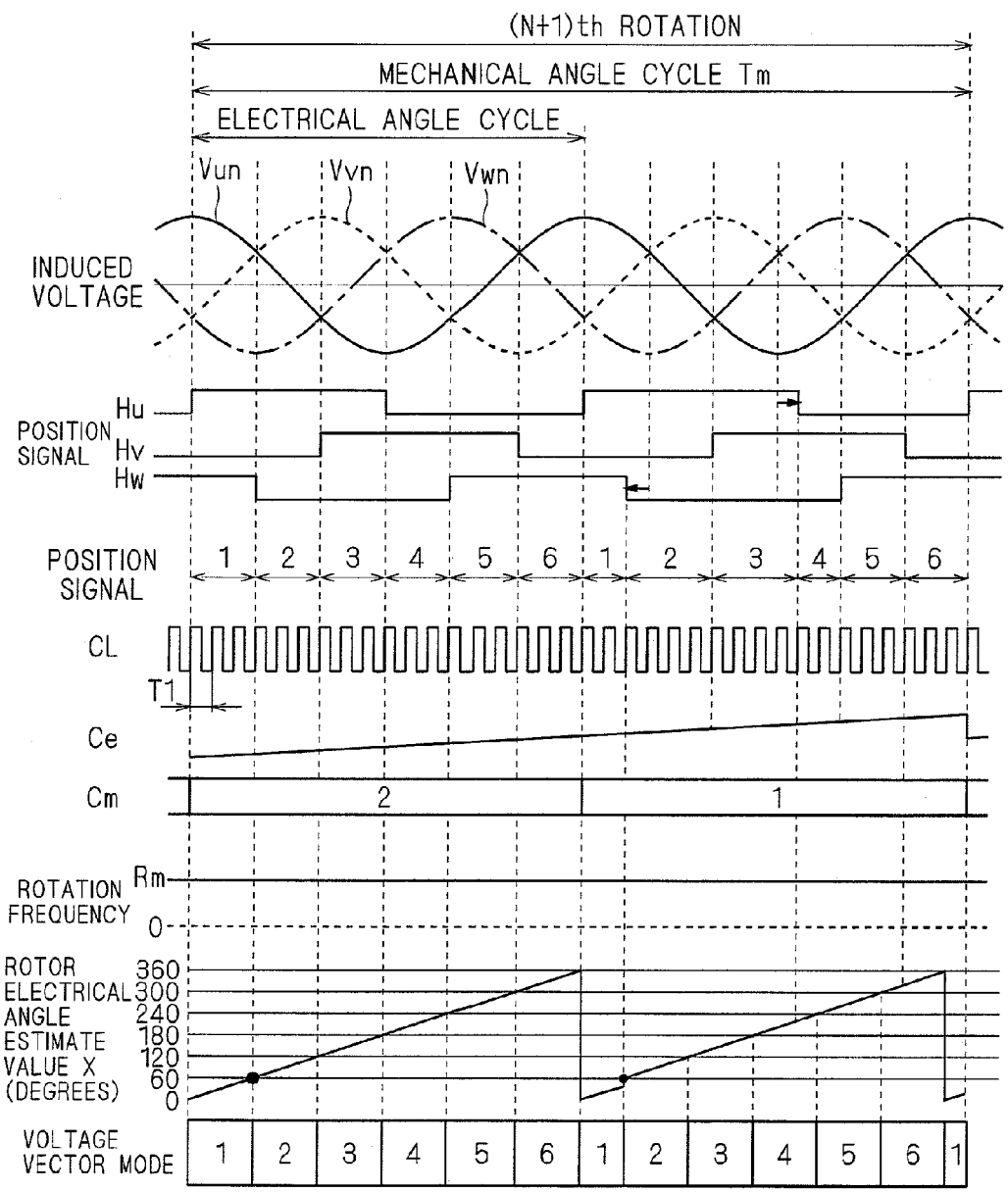

FIGS. 2 and 3 show exemplary timing charts of the motor control device. FIG. 2 shows a timing chart adopted when, for example, the rotation frequency of the rotor 3b is equal to or less than a predetermined value. FIG. 3 shows a timing chart adopted when, for example, the rotation frequency of the rotor 3b is higher than the predetermined value. These will be described in sequence.

<Motor Control Method According to Timing Chart of FIG. 2>

Firstly, a method for calculating a rotation frequency Rm will be described. The rotation frequency Rm is calculated based on a period (hereinafter, referred to as a mechanical angle cycle) Tm of one rotation of the rotor 3b. The mechanical angle cycle Tm can be measured by detecting one rotation of the rotor 3b by the position signals from the position detection sensors Hu, Hv, Hw and, when the one rotation is detected, reading a value obtained by counting a cycle counter clock CL which is repeatedly outputted at intervals of a predetermined time period T1. In the following, a specific description will be given.

The position detection sensors Hu, Hv, Hw are ideally arranged at mechanical angle intervals of 120 degrees, and detect a change in magnetic flux received from a field magnet (not shown) included in the rotor 3b of the motor 3. Thereby, the position signals Hu, Hv, Hw whose phases are reversed at electrical angle intervals of 180 degrees are outputted. A relation between the mechanical angle and the electrical angle depends on the number n of pole pairs in the rotor 3b. The number of pole pairs means the number of pairs of magnetic poles exhibited by the rotor 3b. One rotation in the mechanical angle corresponds to n rotations in the electrical angle. In the examples shown in FIGS. 2 and 3, the number n of pole pairs in the rotor 3b is 2.

The position detection sensors Hu, Hv, Hw output the position signals so as to maintain a certain phase relation with induced voltages Vun, Vvn, Vwn generated in the respective armature windings 3a. For example, the position signal is outputted in a period from when the induced voltage has a maximum value to when the induced voltage has a minimum value, and the position signal is not outputted in the other period.

When the fact that the position detection sensor outputs the position signal is represented by 1 and the fact that the position detection sensor does not output the position signal is represented by 0, there are following six patterns as position signal patterns, namely, (Hu, Hv, Hw)=(1, 0, 1), (1, 0, 0), (1, 1, 0), (0, 1, 0), (0, 1, 1), and (0, 0, 1). These patterns are defined as phase modes 1 to 6 in the mentioned order.

In an ideal case where there is no position misalignment of the position detection sensors Hu, Hv, Hw and no variation in the magnetization of the field magnet included in the rotor, and the like, the phase modes 1 to 6 indicate that the electrical angle is in 0° to 60°, 60° to 120°, 120° to 180°, 180° to 240°, 240° to 300°, and 300° to 360°, respectively. In FIG. 2, there are irregularities in the position signals from the position detection sensors Hu, Hw. An effect caused by these irregularities will be detailed later.

One rotation in the electrical angle can be detected by detecting a change in the phase mode from 6 to 1. To be specific, when the change in the phase mode from 6 to 1 occurs twice (two rotations in an electrical angle), one rotation in the mechanical angle, that is, one rotation of the rotor 3b, can be detected. Two rotations in the electrical angle are detected by, for example, the fact that the mechanical angle cycle detection counter Cm, whose initial value has been set at 2 and is decremented upon each detection of one rotation in the electrical angle, becomes 0.

The cycle counter clock CL, which is repeatedly outputted at intervals of the predetermined time period T1, is counted, and held as a position signal cycle counter Ce. In FIG. 2, the position signal cycle counter Ce is indicated by a straight line. When one rotation of the rotor 3b is detected, the position signal cycle counter Ce is read and the mechanical angle cycle Tm is calculated. The mechanical angle cycle Tm is calculated by obtaining the product of the position signal cycle counter Ce and the time period T1. After the position signal cycle counter Ce is read, the position signal cycle counter Ce is reset.

Then, the rotation frequency Rm is calculated based on the mechanical angle cycle Tm. The rotation frequency Rm is represented as the inverse of the mechanical angle cycle Tm. In this manner, the rotation frequency Rm is calculated each time the rotor 3b makes one rotation.

Next, a description will be given of a method for estimating an electrical angle (hereinafter, referred to as a rotor electrical angle) at which the rotor 3b is positioned, by using the rotation frequency Rm. For example, the rotor electrical angle is estimated as a rotor electrical angle estimate value X(E) at intervals of the time period T1 which is equal to the cycle of the cycle counter clock CL. A rotor electrical angle estimate value X(E−1) means a rotor electrical angle that has been estimated the time period T1 before the time point at which the rotor electrical angle estimate value X(E) is estimated.

The rotation frequency Rm is calculated upon each one rotation. Therefore, when the rotor 3b is in the middle of the (N+1)th rotation, the rotor electrical angle estimate value X(E) is computed using the rotation frequency Rm calculated in the N-th rotation. The rotor electrical angle estimate value X(E) is represented by the following expression using the rotor electrical angle estimate value X(E−1) estimated the time period T1 before, the rotation frequency Rm' which is the rotation frequency Rm represented as an angle, and the time period T1.

$$X(E)=X(E-1)+Rm' \cdot T1 \qquad (1)$$

Thus, the rotor electrical angle of the rotor 3b can be estimated. In FIGS. 2 and 3, the rotor electrical angle estimate value X(E) is expressed by a straight line. However, since the rotation frequency Rm' is not the rotation frequency calculated in the (N+1)th rotation, there may be an error between the rotor electrical angle estimate value X(E) and an actual rotor electrical angle of the rotor 3b. The rotor electrical angle estimate value X(E) can be recognized as a linear function having the time as a variable and the rotation frequency Rm' as a coefficient. Accordingly, as time elapses, in other words, as the rotor electrical angle estimate value X(E) increases, the error increases.

Therefore, when it is detected that the rotor 3b is positioned at a predetermined rotor electrical angle is detected based on the position signals outputted by the position detection sensors Hu, Hv, Hw, the rotor electrical angle estimate value X(E) is made coincident with the predetermined rotor electrical angle. For example, when the phase mode changes from 1 to 2, 3 to 4, and 5 to 6, the rotor electrical angle estimate value X(E) is made coincident with 60°, 180°, and 300°, respectively. In other words, the rotor electrical angle estimate value X(E) is corrected using the position signals from the position detection sensors Hu, Hv, Hw. This can reduce the error in the rotor electrical angle estimate value X(E) based on a difference between the rotation frequency Rm in the N-th rotation and the rotation frequency in the (N+1)th rotation.

In FIG. 2, timings at which the rotor electrical angle estimate value X(E) is corrected into specified values (electrical angles of 60°, 180°, and 300°), respectively, are indicated by black circles on the straight line indicating the rotor electrical angle estimate value X(E).

Next, a description will be given of a method for computing a voltage vector which is to be outputted by the inverter 2, that is, which is to be given to the motor 3. The voltage vector is computed based on a voltage amplitude V and a voltage phase P. The voltage amplitude V is calculated based on a deviation between a rotation frequency command Rm* and the calculated rotation frequency Rm. The voltage phase P is represented as the sum of the rotor electrical angle estimate value X(E) and a voltage phase advance angle. In general, the voltage phase advance angle is calculated based on the rotation frequency Rm.

Then, the gate signals Gxp, Gxn are generated based on the computed voltage vector, and the gate signals Gxp, Gxn are given to the switching elements Sxp, Sxn via the gate drive circuit 21. Due to a switching operation of the switching elements Sxp, Sxn based on the gate signals Gxp, Gxn, the inverter 2 converts the DC voltage Vdc into a desired AC voltage, and outputs it to the motor 3. Here, for the sake of simplification, a description will be given on the assumption that the voltage phase advance angle is 0, that is, the voltage phase P and the rotor electrical angle estimate value X(E) are equal to each other. FIGS. 2 and 3 are also shown on the assumption that the voltage phase advance angle is 0. The voltage phase P is based on a time point at which the induced voltage Vun has a local maximum value. Therefore, the base of the voltage phase P has, in the electrical angle, phase differences of 120 degrees and 240 degrees relative to local maximum values of the induced voltages Vvn, Vwn, respectively.

FIG. 2 shows voltage vector modes outputted by the inverter 2. In the voltage vector modes 1 to 6, the voltage phase P has a value in the ranges of 0 to 60°, 60° to 120°, 120° to 180°, 180° to 240°, 240° to 300°, and 300° to 360°, respectively.

Next, a description will be given of an effect caused when there are irregularities in the position signals of the position detection sensors Hu, Hw. A description will be given of a case where, for example, the position signal of the position detection sensor Hw falls down while the induced voltage Vwn is decreasing from a maximum value to a minimum value and the position signal of the position detection sensor Hu falls down while the induced voltage Vun is increasing from a minimum value to a maximum value. In FIG. 2, the amounts of irregularities are exaggerated.

When the position signal of the position detection sensor Hw falls down, the phase mode changes from 1 to 2. Accordingly, due to the irregularity in the position signal of the position detection sensor Hw, a period of the phase mode 1 is shortened.

As described above, when the phase mode changes from 1 to 2, the rotor electrical angle estimate value X(E) is made coincident with 60°. Therefore, a period in which the voltage phase P, which is assumed to be equal to the rotor electrical angle estimate value X(E), is 0° to 60° (a period of the voltage vector mode 1) is shortened.

When the phase mode changes from 2 to 3, the rotor electrical angle estimate value X(E) is not corrected by using the position signal. In the periods of the phase modes 2 and 3, the rotor electrical angle estimate value X(E) increases while adding up by a certain amount (Rm'·T1) at intervals of the time period T1. Therefore, a period in which the voltage phase P is 60° to 120° (the period of the voltage vector mode 2) and a period in which the voltage phase P is 120° to 180° (the period of the voltage vector mode 3) are equal to each other, and their lengths do not vary. However, since the period of the voltage vector mode 1 is shortened, the voltage vector mode shifts to 2 and 3 at earlier time points, respectively. Thus, in the period of the phase mode 3, the voltage phase P exceeds 180° so that the voltage vector mode shifts from 3 to 4. A time at which the rotor electrical angle estimate value X(E) reaches 180° is earlier by the amount of irregularity in the position signal of the position detection sensor Hw.

When the position signal of the position detection sensor Hu falls down, the phase mode changes from 3 to 4. As described above, when the phase mode changes from 3 to 4, the rotor electrical angle estimate value X(E) is made coincident with 180°. At this time, the voltage vector mode 4 is maintained. A time at which the rotor electrical angle estimate value X(E) is made coincident with 180° is delayed by the amount of irregularity in the position signal of the position detection sensor Hu. Then, the rotor electrical angle estimate value X(E) increases by the predetermined amount at intervals of the time period T1. When the phase mode changes from 4 to 5, the rotor electrical angle estimate value X is not corrected, and therefore a time at which the rotor electrical angle estimate value X(E) reaches 240° is also delayed by the amount of irregularity in the position signal of the position detection sensor Hu.

In this manner, the time at which the rotor electrical angle estimate value X(E) reaches 180° is earlier by the amount of irregularity in the position signal of the position detection sensor Hw, and the time at which the rotor electrical angle estimate value X(E) reaches 240° is delayed by the amount of irregularity in the position signal of the position detection sensor Hu. Therefore, a period in which the voltage phase P is 180° to 240° (the period of voltage vector mode 4) is prolonged by the amounts of irregularities in the position signals of the position detection sensors Hu, Hw.

A period in which the voltage phase P is 240° to 300° (the period of the voltage vector mode 5) is shortened by the amount of irregularity in the position signal of the position detection sensor Hu. This is because, while the time at which the rotor electrical angle estimate value X(E) reaches 240° is delayed by the amount of variation in the position signal of the position detection sensor Hu, a time at which the rotor electrical angle estimate value X(E) is made coincident with 300° is not changed.

In the period of the phase mode 6, the rotor electrical angle estimate value X(E) increases by the certain amount (Rm'·T1) at intervals of the time period T1. Therefore, the length of the period of the voltage vector mode 6 does not vary.

As described above, when the position detection sensors Hu, Hv, Hw detect that the rotor 3b is positioned at electrical angles 60°, 180°, and 300°, the rotor electrical angle estimate value X(E) is made coincident with 60°, 180°, and 300°, respectively. Accordingly, the period of each voltage vector mode varies due to a variation in the position signal of the position detection sensors Hu, Hv, Hw. The variation in the period of each voltage vector mode causes a variation in three-phase operation currents flowing in the respective armature windings 3a, which may result in an unstable rotation frequency of the rotor 3b.

Particularly, the amount of variation in the position detection sensors Hu, Hv, Hw which detect the mechanical angle cycle Tm becomes conspicuous in a case of a rotation frequency in a high-speed rotation. Thus, it is desirable that the motor control method according to the timing chart shown in FIG. 2 is performed when the rotation frequency is less than a predetermined value.

The rotor electrical angle estimate value X(E) in the (N+1)th rotation is computed by using the rotation frequency Rm in the N-th rotation. Therefore, when there is a large difference between the rotation frequency Rm in the N-th rotation and the rotation frequency Rm in the (N+1)th rotation, that is, when a rate of change of the rotation frequency Rm exceeds a predetermined value, the motor control method according to the timing chart shown in FIG. 2 may be performed. In this case, as described above, the error in the rotor electrical angle estimate value X(E), which is based on the difference between the rotation frequency Rm in the N-th rotation and the rotation frequency Rm in the (N+1) rotation, can be reduced. In a low-speed operation performed immediately after the motor is started for example, the rate of change of the rotation frequency is high. Accordingly, by performing the operation method according to the timing chart shown in FIG. 2 when the rotation frequency is less than the predetermined value, an effect from the viewpoint of the rate of change of the rotation frequency Rm is exerted.

The above-described operation can also be recognized as updating the voltage vector to be given to the motor 3, the updating being triggered by the position detection sensors Hu, Hv, Hw detecting that the rotor 3b is positioned at K predetermined electrical angles (for example, K=3 and the electrical angles are 60°, 180°, and 300°).

<Motor Control Method According to Timing Chart of FIG. 3>

A motor control method according to the timing chart of FIG. 3 is different from the motor control method according to the timing chart of FIG. 2, in terms of the timing of making the rotor electrical angle estimate value X(E) coincident by using the position signals of the position detection sensors Hu, Hv, Hw.

In the operation method according to the timing chart of FIG. 2, when the position detection sensors Hu, Hv, Hw detect that the rotor 3b is positioned at electrical angles of 60°, 180°, and 300° for example, the rotor electrical angle estimate value X(E) is made coincident with 60°, 180°, and 300°, respectively. On the other hand, in an operation method according to the timing chart of FIG. 3, when the position detection sensors Hu, Hv, Hw detect that the rotor 3b is positioned at an electrical angle of 60° for example, the rotor electrical angle estimate value X(E) is made coincident with 60°. The other operations are the same as those in the operation method according to timing chart of FIG. 2.

Except when the rotor electrical angle estimate value X(E) is made coincident with 60°, the rotor electrical angle estimate value X(E) increases by the certain amount (Rm'·T1) at intervals of the time period T1. Therefore, as shown in FIG. 3, the periods in which the voltage phase P is 60° to 120°, 120° to 180°, 180° to 300°, and 300° to 360° are equal to one another. Accordingly, a variation in the period of each voltage vector mode can be suppressed, and thereby the rotation frequency of the rotor 3b can be stabilized.

As above, when the rotation frequency Rm is equal to or higher than a predetermined value, the operation method according to the timing chart of FIG. 3 is performed, and when the rotation frequency Rm is less than the predetermined value, the operation method according to the timing chart of FIG. 2 is performed. When the rate of change of the rotation frequency Rm is equal to or higher than a predetermined value, the timing chart of FIG. 2 may be performed, and when the rate of change of the rotation frequency Rm is less than the predetermined value, the timing chart of FIG. 3 may be performed.

The above-described operation can also be recognized as updating the voltage vector to be given to the motor 3, the updating being triggered by the position detection sensors Hu, Hv, Hw detecting that the rotor 3b is positioned at M predetermined electrical angles (for example, M=1 and the electrical angle is 60°). Shifting from the motor control method according to the timing chart of FIG. 2 to the motor control method according to the timing chart of FIG. 3 can be recognized as changing the number of electrical angles into M (K>M≧1) and widening the intervals of updating the voltage vector to be given to the motor 3 relative to the cycle of one rotation of the rotor 3b, widening being triggered by the position detection sensor detecting that the rotor 3b is positioned at a predetermined electrical angle.

<Operation of Each Section>

Next, a description will be given of functions and operations of the phase mode detection section 41, the mechanical angle cycle measurement section 42, the rotation frequency computation section 43, the rotor electrical angle computation section 44, the voltage phase computation section 45, the voltage phase advance angle computation section 46, the voltage vector computation section 47, the rotation frequency control computation section 48, and the correction data holding section 49, which realize the above-described operation.

Referring to FIG. 1, the rotation frequency control computation section 48 computes the voltage amplitude V based on a deviation between the rotation frequency command Rm* and the rotation frequency Rm calculated by the rotation frequency computation section 43. The voltage phase advance angle computation section 46 computes the voltage phase advance angle based on the rotation frequency Rm calculated by the rotation frequency computation section 43. The correction data holding section 49 holds in advance values of a plurality of electrical angles of 60°, 180°, and 300°.

Figure 4:
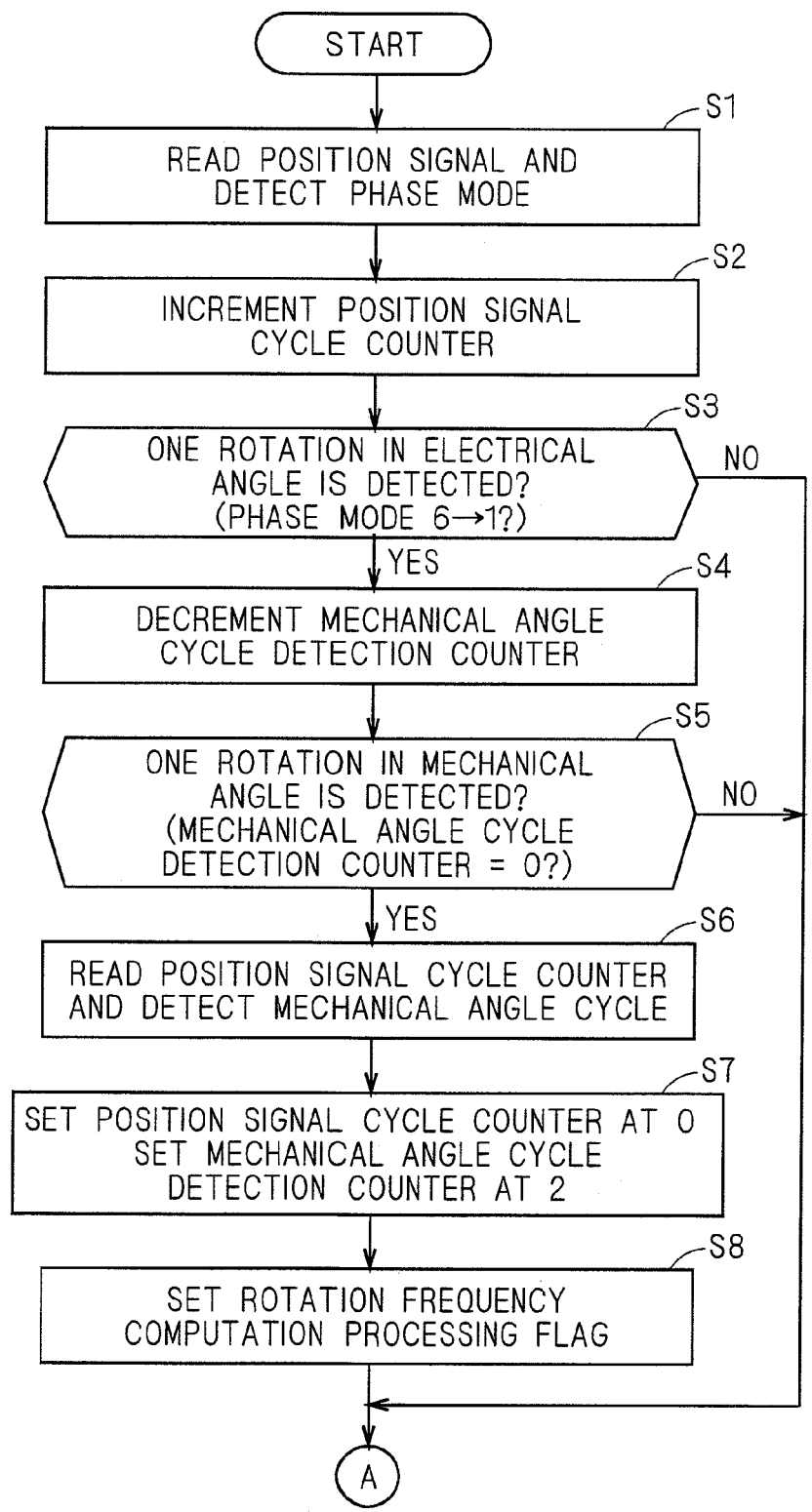
FIGS. 4 to 6 are flowcharts showing an operation of the motor control device.
Figure 5:
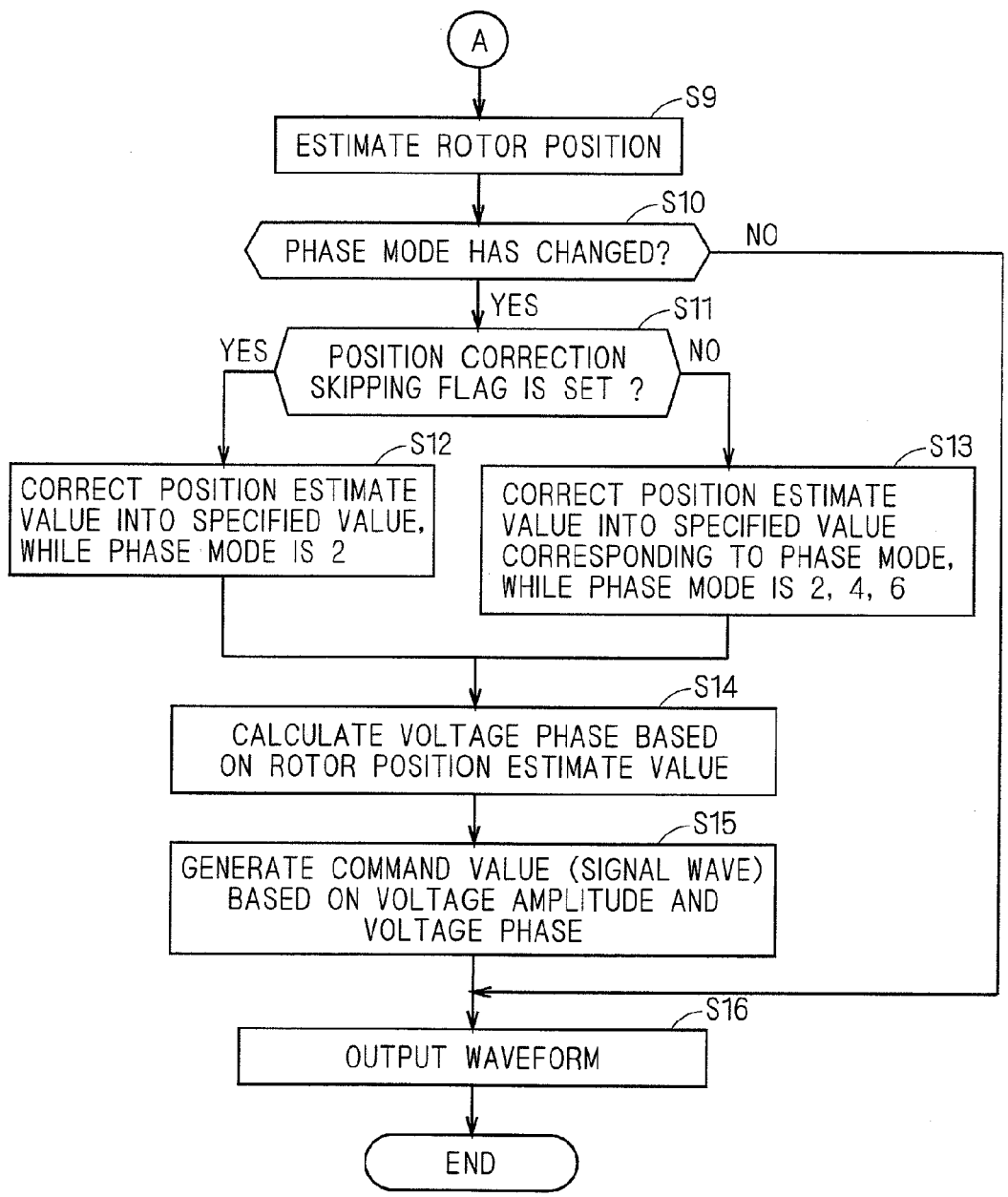
Figure 6:
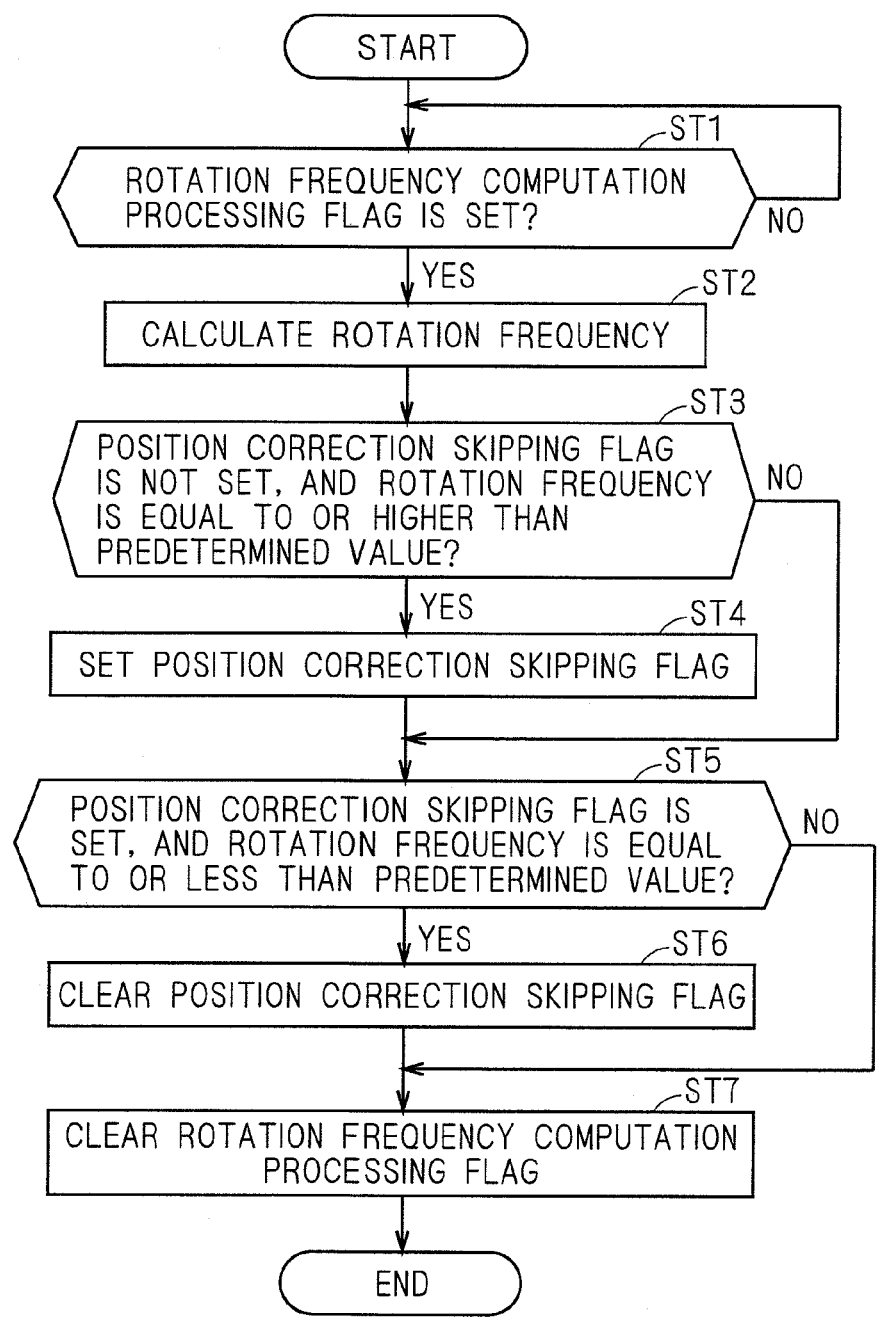

A flowchart of FIGS. 4 and 5 show an operation of outputting the gate signal to the inverter 2, and a flowchart of FIG. 6 shows an operation of computing the rotation frequency of the rotor 3b. For example, a process shown in the flowchart of FIGS. 4 and 5 is repeatedly executed at intervals of the time period T1 which is equal to the cycle of the cycle counter clock CL. A process shown in the flowchart of FIG. 6 is repeatedly executed upon each one rotation of the rotor 3b. The process shown in the flowchart of FIGS. 4 and 5 is given priority over the process shown in the flowchart of FIG. 6.

Firstly, in step S1, the phase mode detection section 41 receives the position signals from the position detection sensors Hu, Hv, Hw, and detects the phase mode.

Then, in step S2, the mechanical angle cycle measurement section 42 receives and counts (increments) the cycle counter clock CL, and holds it as the position signal cycle counter Ce. Thereby, the position signal cycle counter Ce increases by 1, each time the process of this flowchart is executed (for example, at intervals of the time period T1).

Then, in step S3, the mechanical angle cycle measurement section 42 determines whether or not the phase mode has changed from 6 to 1. A change in the phase mode from 6 to 1 means one rotation in the electrical angle. On the other hand, one rotation in the mechanical angle corresponds to n rotations in the electrical angle, when the number of pole pairs in the rotor 3b is defined as n. Here, a case where the number of pole pairs is 2 will be described as an example. Two rotations in the electrical angle are detected by the mechanical angle cycle detection counter Cm.

When the phase mode has changed from 6 to 1, in step S4, the mechanical angle cycle measurement section 42 decrements the mechanical angle cycle detection counter Cm. The mechanical angle cycle detection counter Cm is decremented upon each one rotation in the electrical angle. Thus, two rotations in the electrical angle, that is, one rotation in the mechanical angle (one rotation of the rotor 3b) can be detected.

Then, in step S5, whether or not the mechanical angle cycle detection counter Cm is 0 is determined. When the mechanical angle cycle detection counter Cm is 0, in step S6, the mechanical angle cycle measurement section 42 reads the position signal cycle counter Ce and detects the mechanical angle cycle Tm. The mechanical angle cycle Tm is calculated by obtaining the product of the time period T1 of the cycle counter clock and the position signal cycle counter Ce.

Then, in step S7, the position signal cycle counter Ce is initialized to 0, and the mechanical angle cycle detection counter Cm is set at 2. This is a setup for detecting the next mechanical angle cycle Tm.

Then, in step S8, the mechanical angle cycle measurement section 42 sets a rotation frequency computation processing flag. Thereby, the process shown in the flowchart of FIG. 6 is executed. However, if the execution of the process shown in the flowchart of FIGS. 4 and 5 and the execution of the process shown in the flowchart of FIG. 6 coincide with each other, the process shown in the flowchart of FIGS. 4 and 5 takes priority. The rotation frequency of the rotor 3b is calculated by using the mechanical angle cycle Tm, though the process shown in the flowchart of FIG. 6 will be detailed later.

Then, in step S9, the rotor electrical angle computation section 44 computes the rotor electrical angle estimate value X(E) by using the expression (1).

Then, in step S10, the rotor electrical angle computation section 44 determines whether or not the phase mode has changed. The phase mode changes at electrical angle intervals of 60°. When it is determined that the phase mode has not changed, step S16 is executed which will be described later.

When it is determined that the phase mode has changed, in step S11, the rotor electrical angle computation section 44 determines whether or not a position correction skipping flag is set. When the position correction skipping flag is set, in step S12, the rotor electrical angle computation section 44 takes out the electrical angle 60° from the correction data holding section 49 and makes the rotor electrical angle estimate value X(E) coincident with this electrical angle 60° while the phase mode after the change is 2. When the position correction skipping flag is not set, in step S13, the rotor electrical angle computation section 44 takes out the electrical angles 60°, 180°, and 300° from the correction data holding section 49 and makes the rotor electrical angle estimate value X(E) coincident with the electrical angles 60°, 180°, and 300° while the phase mode after the change is 2, 3, and 6, respectively.

Through either one of steps S12 and S13, in step S14, the voltage phase computation section 45 calculates the voltage phase P based on the rotor electrical angle estimate value X(E) and the voltage phase advance angle. The voltage phase P is represented as the sum of the rotor electrical angle estimate value X(E) and the voltage phase advance angle.

Then, in step S15, the voltage vector computation section 47 calculates the voltage vector based on the voltage amplitude V and the voltage phase P, and calculates a command value (signal wave) based on this.

Then, in step S16, the voltage vector computation section 47 generates the gate signals Gxp, Gxn based on this command value, and outputs these to the gate drive circuit 21.

By the above-describe operation, the switching elements Sxp, Sxn perform a switching operation based on the gate signals Gxp, Gxn, so that the inverter 2 supplies a desired AC voltage to the motor 3, to operate the motor 3.

Next, the process shown in the flowchart of FIG. 6 will be described. In step ST1, the rotation frequency computation section 43 determines whether or not the rotation frequency computation processing flag is set. When the rotation frequency computation processing flag is set by the above-described step S7, the affirmative determination is made in step ST1. When the affirmative determination is made, in step ST2, the rotation frequency computation section 43 computes the rotation frequency Rm of the rotor 3b based on the mechanical angle cycle Tm. The rotation frequency Rm is represented as the inverse of the mechanical angle cycle Tm.

In step ST3, the rotation frequency computation section 43 determines whether or not the position correction skipping flag is not set and additionally the rotation frequency Rm is equal to or higher than the predetermined value. When the negative determination is made, step ST5 is executed which will be described later. When the affirmative determination is made, in step ST4, the rotation frequency computation section 43 sets the position correction skipping flag. The fact that the position correction skipping flag is not set in step ST3 is adopted as a condition for executing step ST4, for the purpose of preventing the position correction skipping flag from being overwritten in step ST4. This can reduce the number of times the position correction skipping flag is written into a recording medium, to prevent deterioration of the recording medium.

Then, in step ST5, the rotation frequency computation section 43 determines whether or not the position correction skipping flag is set and additionally the rotation frequency Rm is less than the predetermined value. When the negative determination is made, step ST7 is executed which will be described later. When the affirmative determination is made, in step ST6, the rotation frequency computation section 43 resets the position correction skipping flag. The fact that the position correction skipping flag is set in step ST5 is set as a condition for executing step ST6, for the purpose of preventing the position correction skipping flag from being overwritten in step ST6.

Then, in step ST7, a rotation frequency computation processing flag is reset.

In steps ST3 and ST5, which of the rotation frequency Rm and the predetermined value is large and small is determined. However, this is not limitative. Which of the rate of change of the rotation frequency Rm and the predetermined value is large and small may be determined. For example, when the rate of change of the rotation frequency Rm is equal to or higher than a predetermined value, step ST6 may be executed, and when the rate is less than the predetermined value, step ST4 may be executed.

Second Embodiment

In the first embodiment, the fan motor including the fan 3c is illustrated as an example of the motor 3. In a second embodiment, other products in which the motor control device described in the first embodiment is mounted will be described. Here, the motor 3 does not include the fan 3c.

Figure 7:
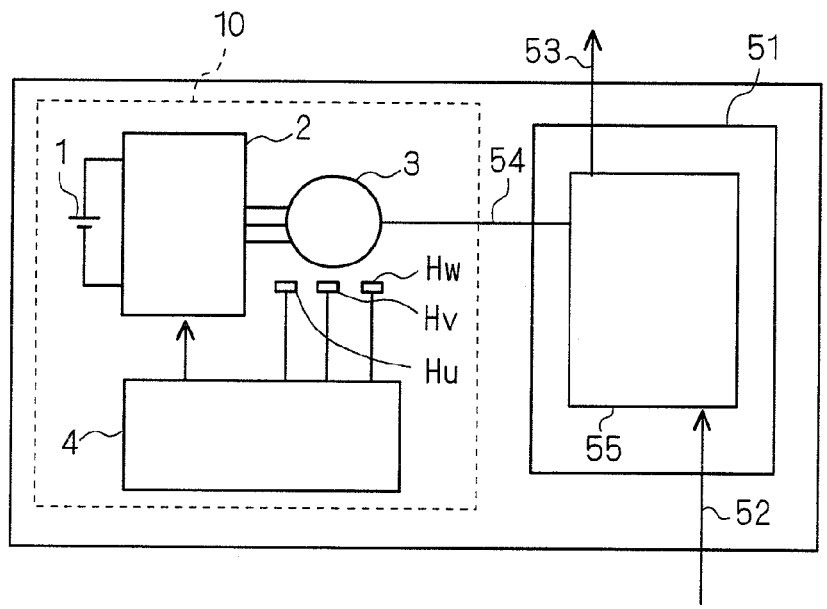
FIG. 7 is a conceptual diagram showing a compressor including the motor control device.

FIG. 7 is a diagram showing an exemplary conceptual configuration of a compressor. A compressor 50 includes a motor driver 10, a compressor mechanism 51, a suction pipe 52, a discharge pipe 53, and a shaft 54. The compressor 50 is mounted in an air conditioner, for example.

The motor driver 10 is the motor driver described in the first embodiment (however, the motor 3 has no fan).

The compressor mechanism 51 is driven by the motor driver 10 via the shaft 54. The compressor mechanism 51 has a compression chamber 55. The volume of the compression chamber 55 is reduced by the rotation of the motor 3. The suction pipe 52 and the discharge pipe 53 are connected to the compression chamber 55. In such a compressor 50, gas (for example, a cooling medium) is sucked through the suction pipe 52 into the compression chamber 55. The sucked gas is compressed based on a change in the volume of the compression chamber, and discharged through the discharge pipe 53.

Figure 8:
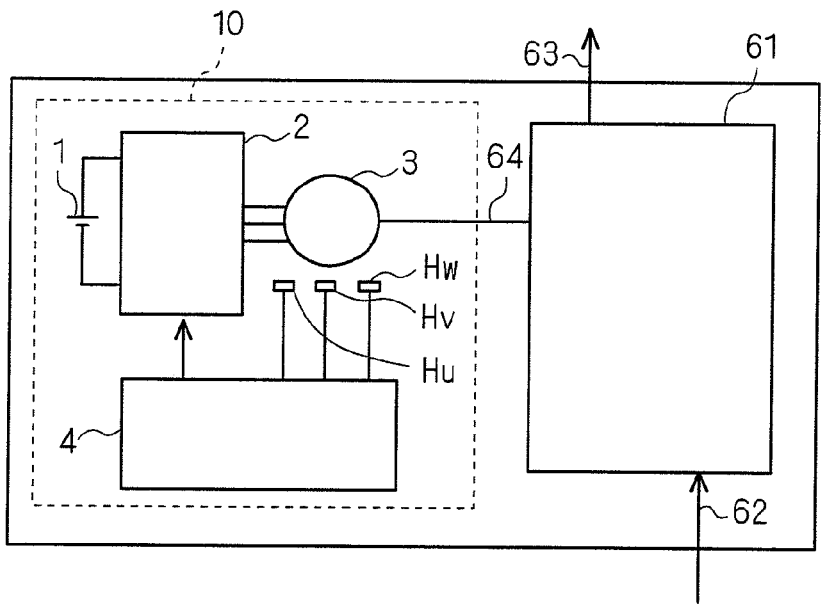
FIG. 8 is a conceptual diagram showing a pump device including the motor control device.

FIG. 8 is a diagram showing an exemplary conceptual configuration of a pump device 60. The pump device 60 includes the motor driver 10, a pump 61, an inlet port 62, a discharge port 63, and a shaft 64. This pump device 60 is mounted in, for example, an automatic dishwashing machine or a water heater.

The pump 61 is driven by the rotation of the motor 3 via the shaft 64. The pump 61 is provided with the inlet port 62 and the discharge port 63. In this pump device 60, liquid (for example, hot water) is sucked through the inlet port 62 into the pump 61 and discharged through the discharge port 63, in accordance with the rotation of the motor 3.

In the compressor of FIG. 7 and the pump device of FIG. 8, the motor driver 10 improves the accuracy of detecting the rotor position, to appropriately control the motor 3. Moreover, as described in the first embodiment, an appropriate voltage vector can be given to the motor 3, which enables a stable control of the motor 3. This can consequently improve the efficiencies of the compressor and the pump device, and also can reduce the power consumptions thereof.

While the invention has been described in detail, the foregoing description is in all aspects illustrative and not restrictive. It is therefore understood that numerous modifications and variations can be devised without departing from the scope of the invention.

The invention claimed is:

1. A motor control device comprising:
   a motor having a rotor;
   a position detection sensor that detects that said rotor is positioned at a predetermined electrical angle; and
   a control section that repeatedly performs the steps of (a) detecting, by said position detection sensor, that said rotor is positioned at K (K>1) predetermined electrical angles and (b) updating a voltage vector to be given to said motor, said updating being triggered by said detection, and further performs the step of (c) increasing a ratio of an interval at which said steps (a) and (b) are repeatedly performed relative to one cycle of rotation of said rotor, by changing the number of said predetermined electrical angles into M (K>M≧1).

2. The motor control device according to claim 1, wherein in said step (b), said control section performs the steps of
   (b1) making an estimate value of said electrical angle coincident with said predetermined electrical angles, when it is detected in said step (a) that said rotor is positioned at said predetermined electrical angles;
   (b2) updating said estimate value based on a time elapsed since said step (b1) has been performed and a rotation frequency of said rotor; and
   (b3) computing said voltage vector based on said estimate value of said electrical angle.

3. The motor control device according to claim 2, wherein said control section performs said step (c), when a rotation frequency of said rotor is higher than a specified value.

4. The motor control device according to claim 2, wherein said control section performs said step (c), when a rate of change of a rotation frequency of said rotor is higher than a specified value.

5. The motor control device according to claim 1, wherein said control section performs said step (c), when a rotation frequency of said rotor is higher than a specified value.

6. The motor control device according to claim 1, wherein said control section performs said step (c), when a rate of change of a rotation frequency of said rotor is higher than a specified value.

7. A fan device comprising:
   the motor control device according to claim 1; and
   a fan driven by said motor.

8. A compressor comprising:
   the motor control device according to claim 1; and
   a compressor mechanism driven by said motor.

9. A pump device comprising:
   the motor control device according to claim 1; and
   a pump having a flow rate therein controlled by said motor.

10. A motor control method which repeatedly performs the steps of:
    (a) detecting, by a position detection sensor, that a rotor included in a motor is positioned at K (K>1) predetermined electrical angles; and
    (b) updating a voltage vector to be given to said motor, said updating being triggered by said detection,
    said motor control method further performing the step of
    (c) increasing a ratio of an interval at which said steps (a) and (b) are repeatedly performed relative to one cycle of rotation of said rotor, by changing the number of said predetermined electrical angles into M (K>M≧1).

11. The motor control method according to claim 10, wherein said step (b) includes performing the steps of:
    (b1) making an estimate value of said electrical angle coincident with said predetermined electrical angles, when it is detected in said step (a) that said rotor is positioned at said predetermined electrical angles;
    (b2) updating said estimate value based on a time elapsed since said step (b1) has been performed and a rotation frequency of said rotor ; and
    (b3) computing said voltage vector based on said estimate value of said electrical angle.

12. The motor control method according to claim 10, wherein said step (c) is performed when a rotation frequency of said rotor is higher than a specified value.

13. The motor control method according to claim 10, wherein said step (c) is performed when a rate of change of a rotation frequency of said rotor is higher than a specified value.

* * * * *